United States Patent
Haneishi et al.

(10) Patent No.: US 7,010,843 B2
(45) Date of Patent: Mar. 14, 2006

(54) MANUFACTURING METHOD FOR DYNAMIC DAMPER

(75) Inventors: Kazunobu Haneishi, Tochigi (JP); Katsuhide Sasaki, Tochigi (JP)

(73) Assignee: Showa Corporation, Saitama (JP)

( * ) Notice: Subject to any disclaimer, the term of this patent is extended or adjusted under 35 U.S.C. 154(b) by 449 days.

(21) Appl. No.: 10/243,161

(22) Filed: Sep. 13, 2002

(65) Prior Publication Data

US 2003/0159268 A1   Aug. 28, 2003

(30) Foreign Application Priority Data

Feb. 22, 2002   (JP)   .............................. 2002-047018

(51) Int. Cl.
    *B23P 11/02* (2006.01)
    *B23P 19/02* (2006.01)
(52) U.S. Cl. .......................... 29/451; 29/525; 29/508; 29/515; 29/450
(58) Field of Classification Search .............. 29/525, 29/508, 515, 516, 450, 451; 464/180
    See application file for complete search history.

(56) References Cited

U.S. PATENT DOCUMENTS

| | | | | |
|---|---|---|---|---|
| 4,889,328 A | * | 12/1989 | Uno et al. .................. | 267/293 |
| 5,413,374 A | * | 5/1995 | Pierce .................. | 280/124.177 |
| 5,865,429 A | * | 2/1999 | Gautheron ................ | 267/141.7 |
| 6,837,345 B1 | * | 1/2005 | Lauble et al. ................ | 188/378 |
| 6,845,995 B1 | * | 1/2005 | Cai et al. ............... | 280/124.169 |
| 2002/0101013 A1 | * | 8/2002 | Kato ...................... | 267/140.11 |

FOREIGN PATENT DOCUMENTS

| | | |
|---|---|---|
| DE | 835314 | 5/1960 |
| DE | 4111233 | 10/1992 |
| DE | 19733478 | 2/1999 |
| WO | 9535454 | 12/1995 |
| WO | WO 99/06730 | * 2/1999 |

OTHER PUBLICATIONS

JP 08290722, Nov. 5, 1996, Japan.
JP 09011762, Jan. 14, 1997, Japan.
JP 09164854, Jun. 24, 1997, Japan.
Japanese Utility Model Application Publication No. HEI 7-29324.

* cited by examiner

*Primary Examiner*—Marc Jimenez
(74) *Attorney, Agent, or Firm*—Orum & Roth LLC

(57) ABSTRACT

This invention provides a manufacturing method of a dynamic damper comprising steps of: forming an annular elastic body; fitting a weight on the inner periphery of the annular elastic body and an outer pipe on the outer periphery; and bonding the weight and the outer pipe on the inner periphery and the outer periphery of the annular elastic body.

8 Claims, 5 Drawing Sheets

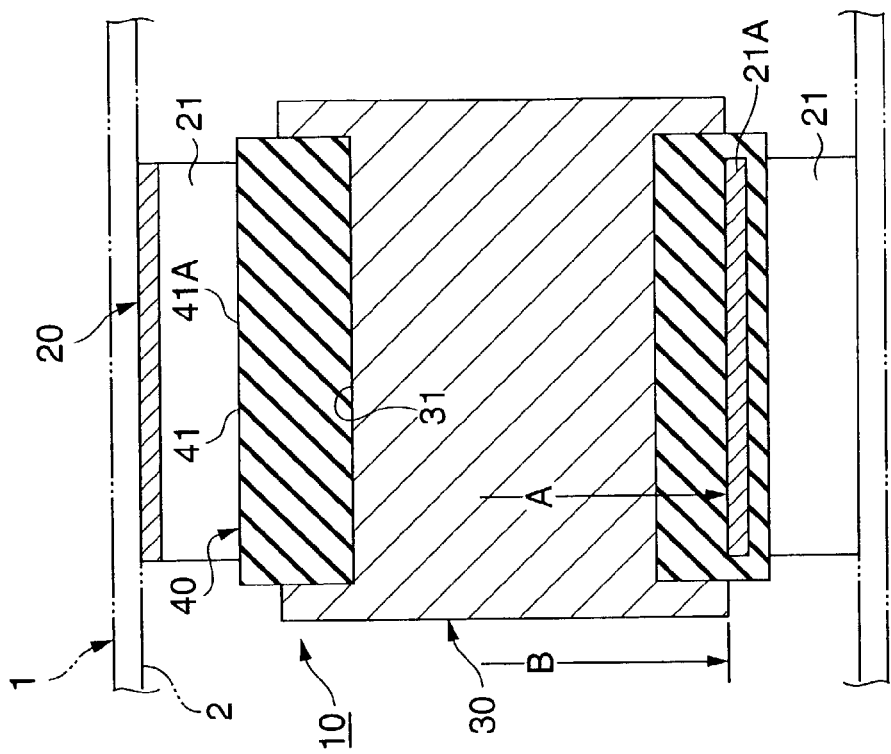
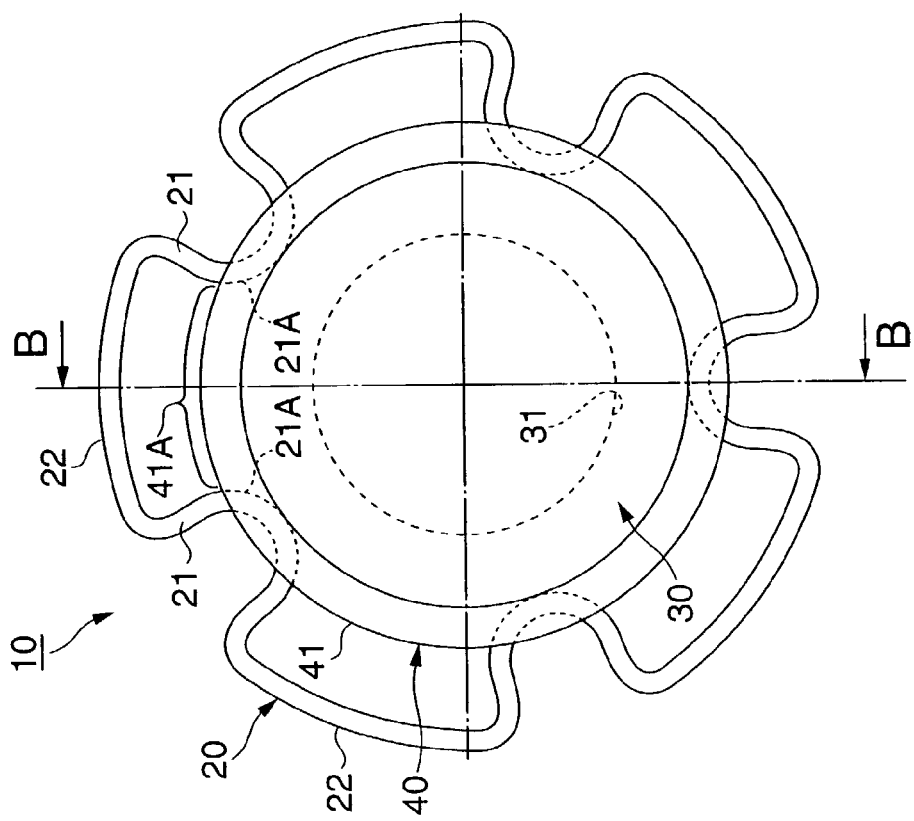

MANUFACTURING METHOD FOR DYNAMIC DAMPER

BACKGROUND OF THE INVENTION

1. Field of the Invention

The present invention relates to a manufacturing method for a dynamic damper.

2. Description of the Related Art

There are dynamic dampers, which reduce vibration of an automobile driving power-transmitting member, such as a propeller shaft, in order to reduce vehicle vibration and mechanical noise. Such dynamic dampers include an outer pipe, a weight disposed inside the outer pipe and an elastic body disposed between the outer pipe and the weight. This dynamic damper is pressed into a hollow shaft constituting the propeller shaft and is fixed thereto.

In the dynamic damper disclosed in Japanese Utility Model Application Publication No. H7-29324, an elastic body is disposed in an annular space between an outer pipe and a weight, and a rod-like elastic interposed portion is provided so as to extend in the radius direction at each of a plurality of positions (five positions) in the circumferential direction of the annular space.

In conventional art, when a dynamic damper is manufactured, rubber is injected into an annular space defined between an outer pipe and a weight such that the outer pipe and the weight have been disposed in a mold to form an elastic body by vulcanization. The elastic body is thereby formed integrally with the outer pipe and the weight.

However, in the rubber injection in the mold, it is difficult to vulcanization-form an elastic body having uniformly even properties along the circumferential direction of the annular space between the outer pipe and the weight. If the spring constants of respective rod-like elastic interposed portions are fluctuated, the resonant characteristic of the dynamic damper is changed, so that a stable damping characteristic cannot be obtained. A mold design and injection are required so that stable vulcanization and cooling of rubber can be obtained. Therefore, the shape of a manufactured product is determined necessarily.

SUMMARY OF THE INVENTION

An object of the present invention is to secure a stable spring constant in an elastic body of a dynamic damper so as to acquire a stable damping characteristic.

According to the present invention, there is disclosed a manufacturing method of a dynamic damper comprising an outer pipe, a weight disposed inside the outer pipe and an elastic body interposed between the outer pipe and the weight. The steps include forming an annular elastic body, fitting a weight in an inner periphery of the annular elastic body and fitting an outer pipe on an outer periphery thereof, and bonding the weight and the outer pipe to the inner periphery and the outer periphery of the annular elastic body respectively.

BRIEF DESCRIPTION OF THE DRAWINGS

The present invention will be more fully understood from the detailed description given below and from the accompanying drawings, which should not be taken to be a limitation on the invention, but are for explanation and understanding only.

The drawings:

FIGS. 1A and 1B show a dynamic damper of the first embodiment, where FIG. 1A is a front view thereof and FIG. 1B is a sectional view taken along the line B—B;

FIG. 4A is a front view thereof and FIG. 4B is a sectional view taken along the line B—B.

DESCRIPTION OF THE PREFERRED EMBODIMENTS (First Embodiment)(FIGS. 1A and 1B, FIG. 2, FIGS. 3A to 3E)

Figure 2:
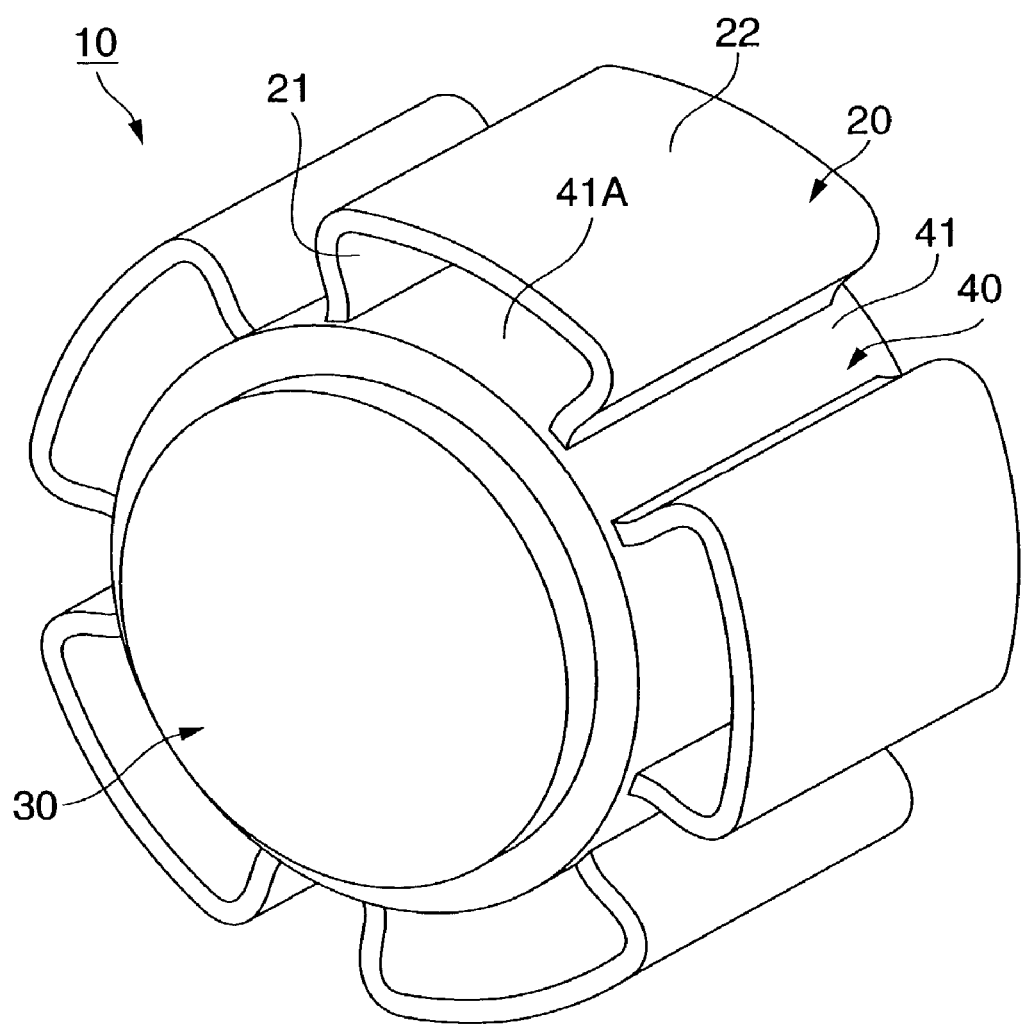
FIG. 2 is a perspective view showing a dynamic damper.

Reference numeral 10 in FIGS. 1A, 1B and FIG. 2 denotes a dynamic damper 10, which is pressed into a hollow shaft 2 of an automobile propeller shaft 1 and disposed at a predetermined position thereof in the axial direction. The dynamic damper 10 reduces vibration of the propeller shaft 1 so as to reduce vehicle body vibration and mechanical noise.

The dynamic damper 10 comprises an outer pipe, 20, a weight 30 and an elastic body 40.

The outer pipe 20 is formed by bending a metallic pipe such as thin steel pipe, in the form of an irregularly shaped cylinder. This outer pipe 20 contains convex portions 21 protruded in the direction of its inside diameter at a plurality of positions (5 positions in this specification) along the circumferential direction. More specifically, in the outer pipe 20, the convex portions 21 are formed by bending the plural portions along the circumferential direction of a round pipe in the direction of the inside direction with a press while remaining portions are kept as circular portions 22 (circular portion 22 having substantially the same curvature of a hollow shaft 2). An end face of the convex portion 21 of the outer pipe 20 acts as a round face pressure-contact face 21A to the outer circumferential portion of an elastic body 40. The outside diameter of the outer pipe 20 under the free state formed by the circular portions 22 is set larger than the inside diameter of the hollow shaft 2. The outside diameter can be contracted elastically from the free state due to the elastic distortion characteristic possessed by the bent portion of the convex portion 21.

The weight 30 is formed of a metallic rod such as steel rod in the form of a short cylinder, such as a circular cylinder. The weight 30 has annular grooves 31 provided in the entire circumference for loading the elastic body 40. The weight 30 is disposed inside the outer pipe 20 coaxially with the outer pipe 20. The weight 30 is wider than the outer pipe 20 (FIG. 1B).

The elastic body 40 is an annular body fitted to an annular groove 31 in the weight 30 over the entire periphery between the outer pipe 20 and the weight 30. The outer periphery of the elastic body 40 has a larger diameter than an outer diameter of the weight 30 and is formed with arc faces continuous along the entire periphery. The elastic body 40 is formed of synthetic rubber or the like and is bonded to the outer pipe 20 and the weight 30 by vulcanization.

In the dynamic damper 10, the elastic body 40 on the weight 30 is nipped and held by a front end pressure-contact face 21A of each convex portion 21 of the outer pipe 20 from radial directions. An outer peripheral portion 41 of the elastic body 40 is nipped and held in the circumferential direction between the front end pressure-contact faces 21A of the convex portions 21 adjacent in the circumferential direction of the outer pipe 20. The front end pressure-contact face 21A of each convex portion 21 engages the outer peripheral portion 41 of the elastic body 40 in a specified depth so that the outer peripheral portion 41A is nipped between the front end pressure-contact faces 21A of the adjacent convex portions 21.

The manufacturing procedure of the dynamic damper 10 is as follows (FIGS. 3A to 3F).

Figure 3A:
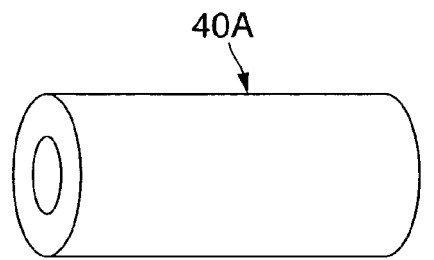
FIGS. 3A to 3E are schematic views showing a manufacturing method for a dynamic damper according to the first embodiment.
Figure 3B:
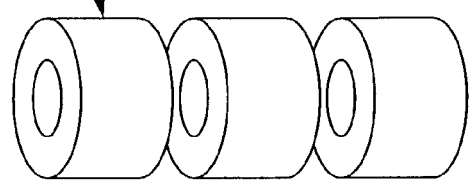

(1) A tube-like elastic body 40A, which is raw material for the annular elastic body 40, is formed separately (FIG. 3A). The tube-like elastic body 40A is cut out to a necessary length to form the annular elastic body 40 (FIG. 3B).

Figure 3C:
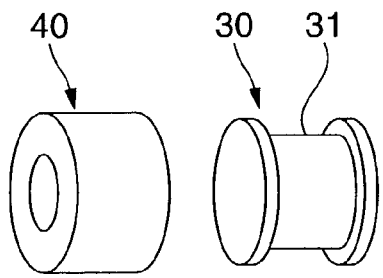
Figure 3D:
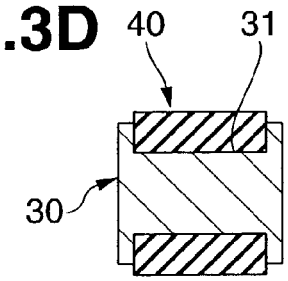

(2) The weight 30 is fitted into the elastic body 40 (FIGS. 3C, 3D). The inner periphery of the elastic body 40 is fitted in the annular groove 31 in the weight 30.

Figure 3E:
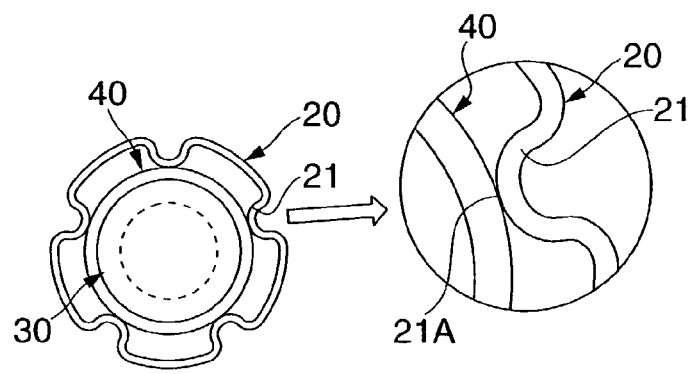

(3) The outer pipe 20 is fitted on an outer periphery of the elastic body 40 (FIG. 3E). The front end pressure-contact face 21A of each convex portion 21 of the outer pipe 20 is fitted to the outer periphery of the elastic body 40.

(4) An assembly obtained by assembling the outer pipe 20 and the weight 30 to the inner and outer peripheries of the elastic body 40 is heated so as to bond the weight 30 and the outer pipe 20 to the inner and outer peripheries of the elastic body 40 by vulcanization respectively.

Figure 3F:
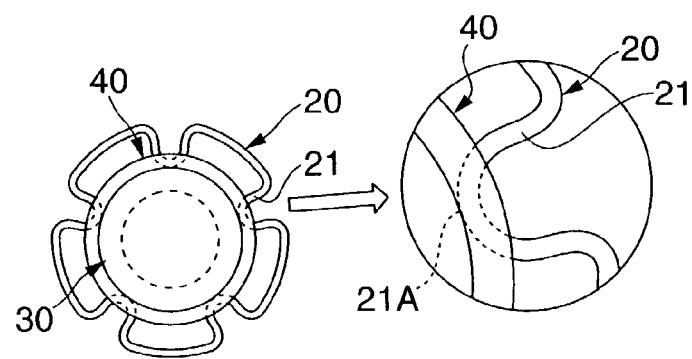
Figure 4B:
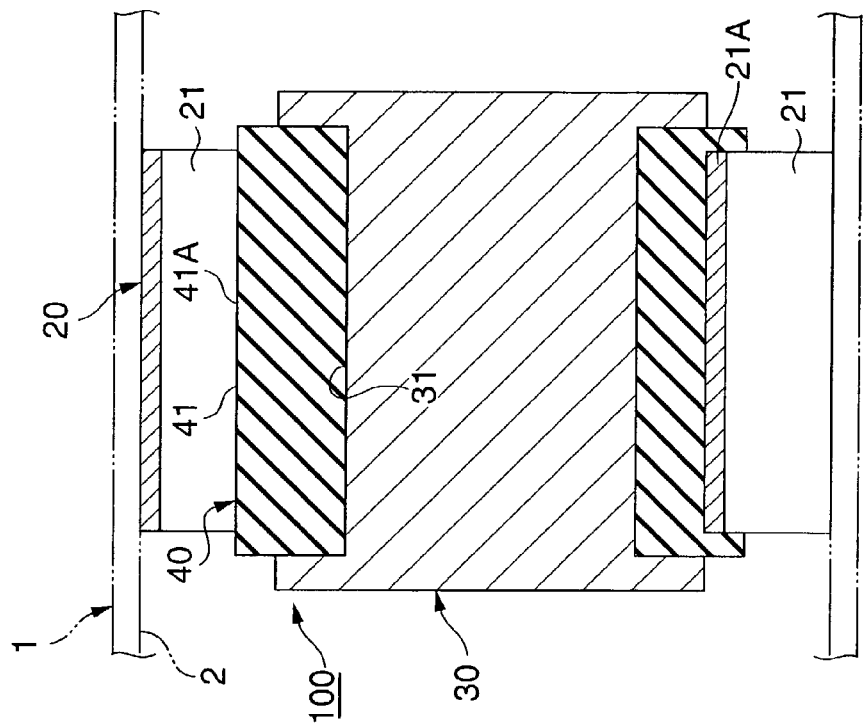
FIGS. 4A and 4B show a dynamic damper of the second embodiment, where
Figure 4A:
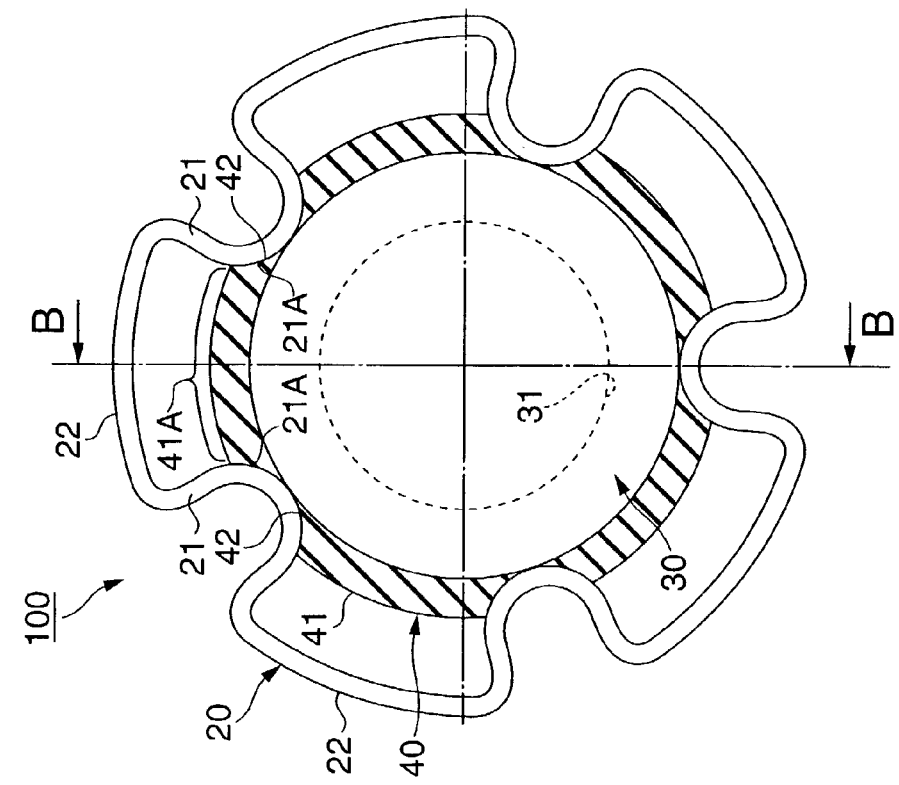

(5) After cooling of the above-described assembly (4), the convex portions 21 of the outer pipe 20 are pressed into the outer periphery of the elastic body 40 with a press so as to complete the dynamic damper 10 (FIG. 3F).

This embodiment exhibits the following characteristics.

(1) By forming the annular elastic body 40 preliminarily, a uniformly even spring constant in the circumferential direction of the elastic body 40 can be secured easily so as to allow the dynamic damper 10 to acquire a stable damping performance.

(2) By engaging the convex portions 21 provided at plural positions of the outer pipe 20 in the circumferential direction thereof with the elastic body 40 with a press, the elastic body 40 is provided with a preliminary load, thereby improving the durability of the dynamic damper 10. At the same time, the outer peripheral portion 41A of the elastic body 40 can be nipped and held firmly between the convex portions 21 of the outer pipe 20 adjacent to each other. Consequently, repeated load due to compression in the radial direction from the weight 30 and shearing stress in the rotation direction based on rotary vibration of the propeller shaft 1 is distributed widely to respective portions of the elastic body 40. Therefore, concentration of stress on the elastic body 40 is suppressed so as to prevent damage from cracks, thereby improving the durability of the dynamic damper 10.

(3) The diameter A of an inscribed circle coming in contact with the respective convex portions 21 of the outer pipe 20 can be made smaller than the diameter B at both end portions of the weight 30. Accordingly, even when slippage of the weight 30 in a lateral direction is caused by deterioration of the elastic body 40 or the like, the outer flanges of the weight 30 at both ends thereof abut the convex portion 21 of the outer pipe 20, so that a large slippage of the weight 30 and therefore falling-off of the weight 30 from the outer pipe 20 is prevented.

(4) Because the convex portions 21 of the outer pipe 20 nip and hold the elastic body 40 through the round face pressure-contact face 21A, the distribution property of the load (1) that is described above, to the elastic body 40 based on vibration of the propeller shaft 1, can be improved.

(5) Because the convex portions 21 are formed by bending respective portions of the outer pipe 20 in the circumferential direction inward, elastic flexibility in the radial direction can be obtained in the bent portion of the convex portion 21. Therefore, when the dynamic damper 10 is press-fit into a hollow shaft 2, any dimensional error between the inner diameter of the hollow shaft 2 and the outer diameter of the outer pipe 20 can be absorbed by elastically flexing deformation of the outer pipe 20 and elastically flexing deformation of the elastic body 40 so as to facilitate the pressing-in. Additionally, after the press-fitting, the dynamic damper can be fixed firmly to the inside face of the hollow shaft due to an elastic restoration force of the outer pipe 20 and the elastic body 40.

(6) Only the plural arc circular portions 22, except the bent portions in which the convex portions 21 are formed on the entire periphery of the outer pipe 20, are press-fitted into the hollow shaft 2 in a rubbing manner. Thus, the contact area of the outer pipe 20 to the inside face of the hollow shaft 2 is decreased, thereby reducing the press-fitting operation force which leads to a reduction of cost in manufacturing equipment.

(7) Because the convex portions 21 can be formed easily on the outer pipe 20 by a bending operation using a press or the like, the round face pressure-contact faces 21A of the convex portions 21 described in (4) can be formed easily.

(8) The items (1) to (7) described above are achieved in the propeller shaft 1, thereby improving the durability of the dynamic damper 10. Additionally, the dynamic damper 10 can be press-fit into the hollow shaft 2 easily and fixed thereto stably.

(Second Embodiment) (FIGS. 4A and 4B, FIGS. 5A to 5E)

A dynamic damper 100 of a second embodiment is different from the dynamic damper 10 of the first embodiment in that the front end pressure-contact face 21A of each convex portion 21 of the outer pipe 20 engages a concave engaging portion 42 with a predetermined depth which is provided on the outer periphery 41 of the elastic body 40 so as to nip and hold the outer peripheral portion 41A between the front end pressure-contact faces 21A of the adjacent convex portions 21.

The manufacturing procedure for the dynamic damper 100 is as follows (FIGS. 5A to 5E).

Figure 5A:
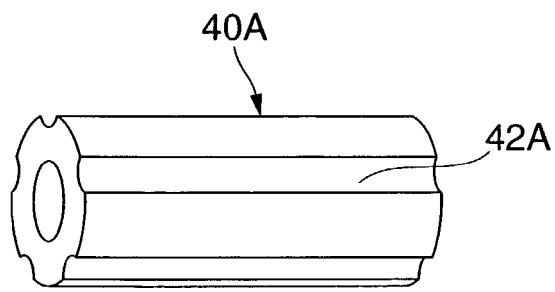
FIGS. 5A to 5E are schematic views showing a manufacturing method for a dynamic damper according to the second embodiment.
Figure 5B:
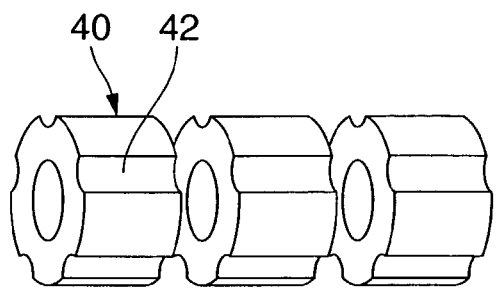

(1) The tube-like elastic body 40A, which is raw material of the annular elastic body 40, is formed separately (FIG. 5A). The tube-like elastic body 40A contains the concave grooves 42A which constitute the concave engaging portions 42, at plural positions (five positions in this embodiment) along the circumferential direction. Then, the tube-like elastic body 40A is cut to necessary lengths so as to form the annular elastic bodies 40 (FIG. 5B).

Figure 5C:
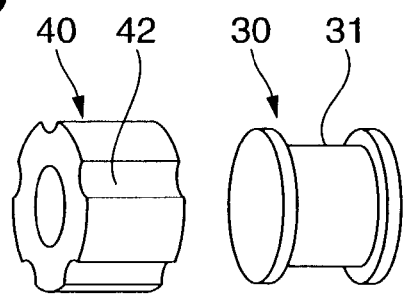
Figure 5D:
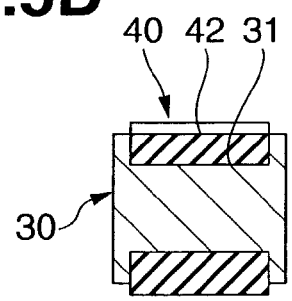

(2) The weight 30 is fitted into the inner periphery of the elastic body 40 (FIGS. 5C, 5D). The inner peripheral portion of the elastic body 40 is fitted in the annular groove 31 in the weight 30.

Figure 5E:
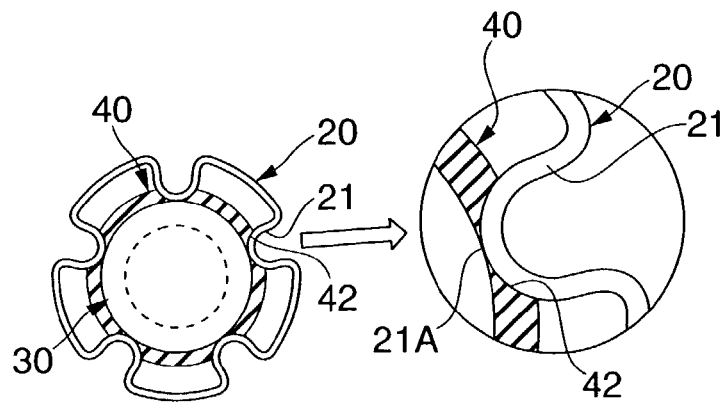

(3) The outer pipe 20 is fitted on the outer periphery of the elastic body 40 (FIG. 5E). The front end pressure-contact face 21A of the convex portion 21 of the outer pipe 20 is fitted in the concave engaging portion 42 in the elastic body 40.

(4) An assembly obtained by assembling the outer pipe 20 and weight 30 onto the inner and outer peripheries of the elastic body 40 is heated, and the weight 30 and the outer pipe 20 are bonded to the inner and outer peripheries of the elastic body 40 by heating so as to form the dynamic damper 100.

In the meantime, after the assembly described in the above description (4) is cooled, it is possible to further engage the convex portion 21 of the outer pipe 20 into the concave engaging portion 42 in the elastic body 40 in a pressing manner. Additionally, it is also possible to provide the engaging portions between the weight 30 and the elastic body 40.

According to this embodiment, the following operations and characteristics are exhibited as well as the operations described already in the first embodiment.

By fitting the convex portions 21 provided at plural positions of the outer pipe 20 in the circumferential direction thereof to the concave engaging portions 42 provided in the outer periphery of the elastic body 40, the outer peripheral portion 41A of the elastic body 40 can be nipped and held firmly between the convex portions 21 of the outer pipe 20 adjacent to each other. Repeated load due to compression in the radial direction from the weight 30 and shearing stress in the rotation direction based on rotary vibration of the propeller shaft 1 is distributed widely to respective portions of the elastic body 40. Therefore, concentration of stress upon the elastic body 40 can be suppressed so as to prevent damage by cracks, thereby improving the durability of the dynamic damper 10.

As heretofore explained, embodiments of the present invention have been described in detail with reference to the drawings. However, the specific configurations of the present invention are not limited to the embodiments, but those having a modification of the design within the range of the present invention are also included in the present invention. For example, the dynamic damper of the present invention can be applied to a power transmitting member other than the propeller shaft.

As described above, the present invention enables a stable spring constant to be secured in the elastic body of the dynamic damper so as to acquire a stable vibration resistant characteristic.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A manufacturing method of a rotating dynamic damper comprising an outer pipe, a weight disposed inside the outer pipe and an elastic body interposed between the outer pipe and the weight, comprising the steps of:

forming an annular uniform cross section elastic body separate from contact with any other elements of the damper;

fitting a weight having an annular groove and corresponding flanges in an inner periphery of the annular elastic body and fitting an outer pipe on an outer periphery thereof such that the flanges extend beyond the annular elastic body and the outer pipe;

bonding the weight and the outer pipe to the inner periphery and the outer periphery of the annular elastic body respectively, and press fitting the damper inside a hollow rotatable propeller shaft.

2. The manufacturing method of a dynamic damper according to claim 1, further comprising a step of providing convex portions projecting inwardly in a radial direction on the outer pipe at a plurality of positions thereon in a circumferential direction thereof in advance to cause the convex portions of the outer pipe fitted on the outer periphery of the annular elastic body to be engaged with the elastic body by press-fitting.

3. The manufacturing method of a dynamic damper according to claim 2, wherein the annular elastic body is made of synthetic rubber and is bonded to the weight and the outer pipe by vulcanization.

4. The manufacturing method of a dynamic damper according to claim 1, further comprising a step of providing convex portions projecting inwardly in a radial direction on the outer pipe at a plurality of positions thereon in a circumferential direction thereof in advance and providing engaging portions engaged with the convex portions of the outer pipe on the outer periphery of the annular body in advance to cause the convex portions of the outer pipe to be engaged with the engaging portions of the elastic body when the outer pipe is fitted on the annular elastic body.

5. The manufacturing method of a dynamic damper according to claim 4, further comprising a step of engaging the convex portions of the outer pipe to the engaging portions of the elastic body in a pressing manner by a press operation after the convex portions of the outer pipe are fitted in the engaging portions of the annular elastic body.

6. The manufacturing method of a dynamic damper according to claim 5, wherein the annular elastic body is made of synthetic rubber and is bonded to the weight and the outer pipe by vulcanization.

7. The manufacturing method of a dynamic damper according to claim 4, wherein the annular elastic body is made of synthetic rubber and is bonded to the weight and the outer pipe by vulcanization.

8. The manufacturing method of a dynamic damper according to claim 1, wherein the annular elastic body is made of synthetic rubber and is bonded to the weight and the outer pipe by vulcanization.

* * * * *